Patented Oct. 30, 1951

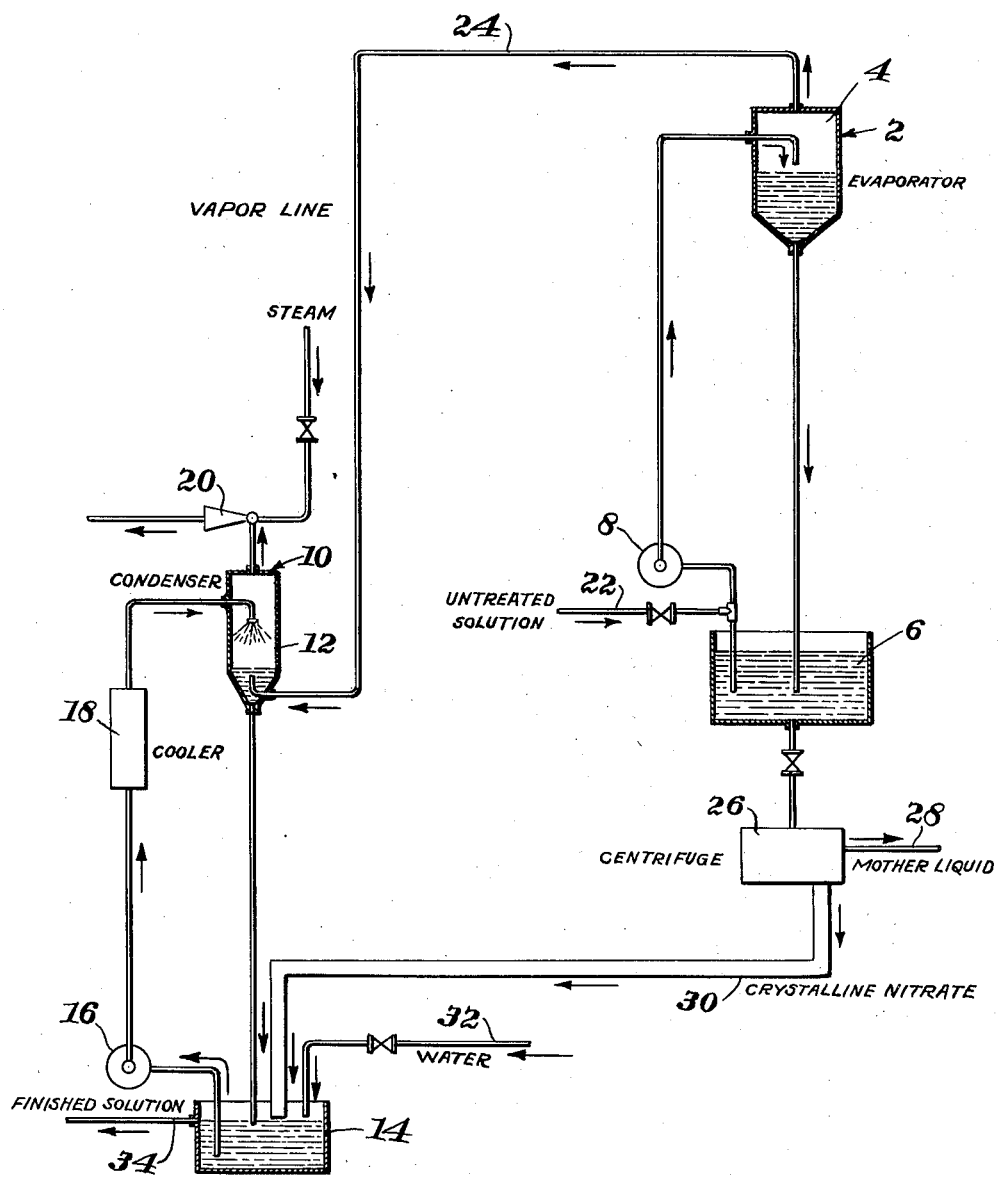

2,573,516

UNITED STATES PATENT OFFICE 2,573,516

TREATMENT OF SOLUTIONS

Arie Pieter van der Molen, Beek, Netherlands, assignor to De Directie van Staatsmijnen in Limburg, Heerlen, Netherlands Application February 25, 1948, Serial No. 10,753
In the Netherlands February 28, 1947

3 Claims. (Cl. 23—102)

This invention relates to the treatment of solutions. More particularly, it is concerned with the preparation of solutions from the volatile solvent and one or more solutes contained as components of another solution of more complex nature than the desired simple solution and to apparatus for carrying out these preparations.

When it is required to prepare from a compound solution another simpler solution consisting of at least one of the solutes of the original solution dissolved in the volatile solvent of the original solution, this may be accomplished by cooling down the original solution to crystallize the desired component or components from the solution, separating the crystals from the mother liquor, evaporating or distilling the volatile solvent from the solution, and then redissolving the crystals in the regained solvent.

This situation arises in the preparation of fertilizers from rock phosphates when, after decomposing rock phosphate with nitric acid, the calcium nitrate formed during the reaction is removed from the acid aqueous solution wholly, or in part, as crystalline calcium nitrate tetrahydrate by cooling, e. g., see U. S. Patent No. 1,816,285, centrifuging or pressing, and finally dissolving the tetrahydrate crystals in water to form a solution of 50 to 55 percent.

In cooling and crystallizing the original solution, a certain amount of heat energy must be removed from the liquid, either directly through a wall by a cooling medium or by using the heat to evaporate part of the solvent under reduced pressure in a vacuum crystallizer, the escaping vapors, substantially water, carrying off the energy to be removed.

These vapors may be condensed, e. g., in a direct condenser, in which the vapors and a suitable cooling liquid are brought into intimate contact. In this way, the energy withdrawn from the original solution is transferred to and removed by this cooling liquid. When using a direct condenser with circulating cooling medium, a cooling device in the condenser circuit is required to maintain the circulating medium at a sufficiently low temperature. In any case, the energy withdrawn from the original solution is carried off outside the system and, in most cases, is a total loss.

On the other hand, a certain amount of heat energy must be supplied to redissolve the solids obtained in the crystallizer and separated from the mother liquor.

A principal object of this invention is the provision of new procedures for the preparation of a simple solution from components contained in a more complex and separate solution. Further objects include:

(1) The provision of apparatus for conducting such procedures;

(2) The provision of new procedures which materially increase the efficiency of salt crystallization and solution operations;

(3) The provision of new procedures for use in the manufacture of fertilizers and by-products from rock phosphates;

(4) The provision of a new process for the crystallization of calcium nitrate from acid decomposition solutions of phosphate rock and for the solution of the crystallized calcium nitrate to form concentrated aqueous solutions thereof.

These objects are accomplished according to the present invention by using all or part of the energy set free during the cooling and crystallization of the original solution for redissolving the crystals formed in the crystallizer by direct condensation of vapors evolved from the crystallizing solution in a portion of the second solution. To this effect, the compound solution is cooled down in a vacuum crystallizer, the desired simpler solution is circulated in a direct condenser connected with the crystallizer, so as to bring the vapors, escaping from the crystallizer, in direct contact with the aqueous condensing medium circulating in the direct condenser, and the crystals formed in the crystallizer are dissolved in the last mentioned solution.

A more complete comprehension of the apparatus and procedures of this invention may be had by reference to the attached drawing, in which the figure is a diagrammatic view of one form of apparatus which may be employed to conduct the procedures of this invention.

Referring in detail to the drawing, the vacuum crystallizer 2 (by way of example drawn as of the type with circulating solution) has an evaporation space 4 and crystallization space 6, the solution being circulated by means of a pump 8.

The direct condenser 10 consists of a condensing space 12 and tank 14. The solution circulating in the condenser (a solution of calcium nitrate of about 50% strength) is cooled by being circulated by means of a pump 16 through the cooler 18. The direct condensing solution employed in the condenser should have a low vapor pressure relative to the complex solution which is evaporated.

During operation, vacuum is maintained by a steam ejector 20.

Fresh compound solution is fed to the crystallizer continuously through line 22 and is cooled down in order to eliminate a predetermined quantity of calcium nitrate from the solution. The vapors are led to the direct condenser through line 24.

The crystalline nitrate is separated from the mother liquid by means of a centrifuge 26, the mother liquor being discharged through line 28, and then transferred to the tank 14 of the condenser by means of a chute or conveyor 30, to be redissolved in the cooling liquid circulating in the condenser, the required energy being supplied by the vapors condensing in 12. In order to maintain the solution of calcium nitrate in the condenser circuit at the required strength, water is supplemented through line 32. The solution of calcium nitrate is removed continuously by an overflow 34.

A further understanding of the invention may be obtained by consideration of the following illustrative example of actual operation of the procedure of this invention.

*Example*

An acid solution of phosphate rock is made by dissolving the phosphate material in nitric acid. 18,050 kg. of the solution at 19.4° C. is charged into a vacuum crystallizer and cooled to 15° C. under a vapor tension of 4.3 mm. of Hg. Simultaneously with the evaporation of 190 kg. of water, 1900 kg. of calcium nitrate tetrahydrate are crystallized from the solution. This crystalline mass is separated from the mother liquor by a centrifuge and is then transported to the direct condenser connected to the vacuum crystallizer where the crystals are dissolved in the aqueous solution which is circulated in the direct condenser for condensation of the evaporated vapors removed from the vacuum crystallizer, in order to form an aqueous solution of calcium nitrate of 52% strength. The vapor tension in the condenser space is maintained at 3.6 mm. of Hg.

Condensation of the vapor removed from the vacuum crystallizer results in the liberation of 110,900 kcal. of heat, and cooling down the crystals to 3.2° C. liberates 2200 kcal.

To maintain the strength of the cooling solution, i. e., 52%, 450 kg. of water at 25° C. are supplied to the condenser system. Cooling this quantity of water down to 3.2° C. liberates another 9800 kcal. Consequently, the total quantity of energy supplied to the condenser amounts to 122,900 kcal.

The dissolving of 1900 kg. of calcium nitrate requires 64,600 kcal. of heat, thus, leaving 58,300 kcal. to be removed by the cooling system of the crystallizer.

In another case in which the procedure of this invention is not employed, 110,900 kcal. are removed from the condenser by a cooling system. On the other hand, 64,600 kcal. must be supplied for the separate dissolving of the crystalline nitrate. Consequently, it can be seen that the procedure of this invention results in the saving of 117,200 kcal. of heat for every 18,050 kg. of phosphate solution treated.

It will be appreciated that the procedures and apparatus of this invention may be employed for the treatment of various complex solutions. However, the invention is particularly adapted to the treatment of acid phosphate solutions containing calcium nitrate and for the solution of calcium nitrate separated from the phosphate solution.

I claim:
1. A process for obtaining a simple solution of a compound contained as one of the solutes of a complex solution which comprises: evaporating a solution of a compound having a negative heat of solution in the solution solvent in a confined zone, said solution containing at least one other solute, under reduced pressure to crystallize the compound; condensing substantially all of the vapors resulting from the evaporation by direct contact with a circulating cooling liquid containing previously condensed vapors from the complex solution; conveying the aforementioned crystallized compound to a zone separate from said evaporation zone, and dissolving the crystallized compound in said condensing liquid.

2. A process for obtaining a simple solution of one solute, having a negative heat of solution in the solution solvent of a more complex solution which comprises evaporating the solvent from the complex solution under reduced pressure thereby causing a crystalline product to precipitate from the complex solution, condensing substantially all the solvent vapors liberated from the complex solution in a second solution separate from said complex solution formed of said crystalline product and evaporated solvent by direct contact of said vapors with said second solution, removing crystals formed by the evaporation step from the complex solution, and dissolving the separated crystals in said second solution.

3. A process for preparing an aqueous solution of calcium nitrate from an aqueous acid solution of phosphate rock and nitric acid which comprises cooling the phosphate solution by evaporating water from the phosphate solution under reduced pressure, condensing the water evaporated from the phosphate solution by direct contact with a concentrated solution of calcium nitrate, adding additional water to the calcium nitrate solution, separating calcium nitrate crystals from the acid phosphate solution and dissolving the separated calcium nitrate crystals in the calcium nitrate solution into which the water vapors of the phosphate solution are condensed.

ARIE PIETER van der MOLEN.

REFERENCES CITED

The following references are of record in the file of this patent:

UNITED STATES PATENTS

| Number | Name | Date |
|---|---|---|
| 573,964 | Craig | Dec. 29, 1896 |
| 1,879,445 | Othmer | Sept. 27, 1932 |
| 1,972,730 | Connell et al. | Sept. 4, 1934 |
| 1,997,277 | Burke et al. | Apr. 9, 1935 |

OTHER REFERENCES

Handbook of Chemistry and Physics, 28th ed., pp. 1417–1419, Cleveland, Chemical Rubber Pub. Co., 1944.